United States Patent
Yamaguchi

(10) Patent No.: US 10,420,290 B2
(45) Date of Patent: Sep. 24, 2019

(54) METHOD FOR CULTIVATING PLANTS OF ASTERACEAE FAMILY

(71) Applicant: SUMITOMO RUBBER INDUSTRIES, LTD., Kobe-shi, Hyogo (JP)

(72) Inventor: Haruhiko Yamaguchi, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 277 days.

(21) Appl. No.: 15/408,744

(22) Filed: Jan. 18, 2017

(65) Prior Publication Data

US 2017/0231162 A1    Aug. 17, 2017

(30) Foreign Application Priority Data

Feb. 16, 2016 (JP) ................. 2016-027162

(51) Int. Cl.
| | |
|---|---|
| *A01G 22/00* | (2018.01) |
| *A01G 7/00* | (2006.01) |
| *A01G 9/20* | (2006.01) |

(52) U.S. Cl.
CPC .............. *A01G 22/00* (2018.02); *A01G 7/00* (2013.01); *A01G 9/20* (2013.01)

(58) Field of Classification Search
CPC ..................................... A01G 22/60
USPC ..................................... 47/58.1 LS
See application file for complete search history.

(56) References Cited

U.S. PATENT DOCUMENTS

| | | | | |
|---|---|---|---|---|
| 3,890,740 A | * | 6/1975 | Miller ...................... | A01G 7/00 47/1.01 R |
| 4,897,957 A | * | 2/1990 | Oglevee ................... | A01H 3/02 47/58.1 R |
| 5,642,587 A | * | 7/1997 | Janes ........................ | A01G 7/00 47/58.1 R |
| 6,401,386 B1 | * | 6/2002 | Ko .......................... | A01G 9/029 47/58.1 SE |
| 2008/0178349 A1 | * | 7/2008 | Coleman .................. | A01G 7/00 800/278 |
| 2015/0096230 A1 | * | 4/2015 | Ankner .................... | A01G 22/00 47/59 R |
| 2016/0044871 A1 | * | 2/2016 | Ogiwara ................. | A01G 22/00 47/65 |
| 2016/0219801 A1 | * | 8/2016 | Okada ...................... | C12N 5/04 |
| 2016/0237254 A1 | * | 8/2016 | Yamaguchi ............... | C08L 7/02 |
| 2017/0073634 A1 | * | 3/2017 | Okada ..................... | A01H 4/001 |
| 2017/0215353 A1 | * | 8/2017 | Schurter .............. | A01G 13/0206 |
| 2017/0280643 A1 | * | 10/2017 | Ankner .................... | A01G 22/00 |
| 2018/0271043 A1 | * | 9/2018 | Van Dijk ................. | A01H 5/02 |
| 2018/0319904 A1 | * | 11/2018 | Van Dijk ................. | C08C 1/02 |

FOREIGN PATENT DOCUMENTS

| | | | |
|---|---|---|---|
| CN | 104686150 | * | 3/2017 |
| JP | 03139224 | * | 3/1991 |
| JP | 2012-39901 A | | 3/2012 |

OTHER PUBLICATIONS

Effects of Plant Size, Temperature, and Light Intensity on Flowering of Phalaenopsis Hybrids in Mediterranean Greenhouses, Paradiso, Nov. 20, 2014 (Year: 2014).*
High Hopes for Rubber Plant, Taraxacum kok-saghyz, Modern Agriculture Magazine, Jan. 21, 2016 (Year: 2016).*

* cited by examiner

*Primary Examiner* — Magdalena Topolski
(74) *Attorney, Agent, or Firm* — Birch, Stewart, Kolasch & Birch, LLP

(57) ABSTRACT

A method for cultivating plants of the Asteraceae family, which promotes flower bud formation in the reproductive phase. A method for cultivating plants of the Asteraceae family, wherein the cultivation temperature in the reproductive phase is set lower by at least 5° C. than the cultivation temperature in the vegetative phase to promote flower bud formation in the reproductive phase.

4 Claims, No Drawings

METHOD FOR CULTIVATING PLANTS OF ASTERACEAE FAMILY

TECHNICAL FIELD

The present invention relates to a method for cultivating plants of the Asteraceae family.

BACKGROUND ART

Natural rubber industrially used currently is derived from *Hevea brasiliensis* (Para rubber tree). However, since the region where *Hevea brasiliensis* can be cultivated is limited, there is a high demand for alternative plants producing natural rubber.

As an alternative plant producing natural rubber, *Taraxacum kok-saghyz* (Russian dandelion) has been drawing attention because natural rubber can be obtained from its roots, and temperate zones can be selected to cultivate it. Accordingly, methods for extracting rubber from this plant have been under development.

In order to create new varieties of crops suited to specific purposes, crossbreeding techniques are often used. These techniques involve breeding or crossing different varieties with different properties to create new varieties with new properties. For crossing, it is necessary to cause plants to bloom and be pollinated. Thus, the crossbreeding techniques require flower bud formation.

In order for plants to shift to the flower bud formation stage (reproductive phase), factors such as: (1) age of the plants, (2) photocycle, and (3) temperature are known to be important.

For example, with respect to (2) photocycle, plants are roughly divided into long-day plants which start forming flower buds when the sunshine duration increases above a certain length; short-day plants which start forming flower buds when the sunshine duration decreases below a certain length; and neutral plants which form flower buds regardless of the photocycle.

Chrysanthemums, which are short-day plants, are treated as follows. For example, the lighting duration is extended to suppress flower bud formation until they grow large enough to sell as products, but once they are large enough, the lighting duration is shortened to promote flower bud formation (see for example Patent Literature 1).

CITATION LIST

Patent Literature

Patent Literature 1: JP-A 2012-39901

SUMMARY OF INVENTION

Technical Problem

Methods for promoting flower bud formation have been studied for flowering plants and crops, while no studies have been made on methods for promoting flower bud formation in dandelions of the Asteraceae family.

Accordingly, the present invention aims to solve the above problem and provide a method for cultivating plants of the Asteraceae family, which promotes flower bud formation in the reproductive phase.

Solution to Problem

For common dandelions (*Taraxacum officinale*), which are regarded as neutral plants, it is necessary to control flower bud formation by using conditions other than sunshine duration. As a result of extensive research, the present inventor focused on cultivation temperature and sunshine intensity. Further, the present inventor made various studies and found that in the cultivation of plants of the Asteraceae family, flower bud formation in the reproductive phase can be promoted by setting the cultivation temperature in the reproductive phase lower by at least certain degrees than the cultivation temperature in the vegetative phase, in an environment with not more than a certain level of illuminance. Thus, the present invention has been completed.

Specifically, the present invention relates to a method for cultivating plants of the Asteraceae family, wherein the cultivation temperature in the reproductive phase in an environment with an illuminance at the leaf level under light conditions of 10000 1x or lower is set lower by at least 5° C. than the cultivation temperature in the vegetative phase to promote flower bud formation in the reproductive phase.

The cultivation temperature in the reproductive phase is preferably set lower by at least 7° C. than the cultivation temperature in the vegetative phase.

The cultivation temperature in the reproductive phase is preferably 18° C. or lower, more preferably 16° C. or lower.

The plants of the Asteraceae family are preferably plants of the genus *Taraxacum*

The plants of the Asteraceae family are preferably *Taraxacum kok-saghyz* or *Taraxacum brevicorniculatum*.

Advantageous Effects of Invention

According to the method for cultivating plants of the Asteraceae family of the present invention, flower bud formation in the reproductive phase can be promoted by setting the cultivation temperature in the reproductive phase lower by at least 5° C. than the cultivation temperature in the vegetative phase, in an environment with an illuminance at the leaf level under light conditions of 10000 1x or lower.

DESCRIPTION OF EMBODIMENTS

The method for cultivating plants of the Asteraceae family of the present invention promotes flower bud formation in the reproductive phase by setting the cultivation temperature in the reproductive phase lower by at least 5° C. than the cultivation temperature in the vegetative phase, in an environment with an illuminance at the leaf level under light conditions of 10000 1x or lower.

According to the present invention, in the cultivation of plants of the Asteraceae family, flower bud formation in the reproductive phase can be promoted by setting the cultivation temperature in the reproductive phase lower by at least 5° C. than the cultivation temperature in the vegetative phase, in an environment with an illuminance at the leaf level under light conditions of 10000 1x or lower. In other words, the plants of the Asteraceae family can be allowed to shift from the vegetative phase to the reproductive phase simply by changing their cultivation temperature. Thus, according to the present invention, it is possible to control flower bud formation in plants of the Asteraceae family simply by changing their cultivation temperature.

In addition, according to the present invention, since it is possible to control flower bud formation in plants of the Asteraceae family, amounts of pollen and pistil necessary for crossing can be easily obtained in plants of the Asteraceae family by promoting their flower bud formation to allow many flowers to bloom. Consequently, the crossing frequency can be increased.

In addition, according to the present invention, flower bud formation in plants of the Asteraceae family is promoted by lowering the temperature. This means that if the temperature is not lowered, it is possible to continue cultivating plants of the Asteraceae family while suppressing their flower bud formation. For example, when crossing between different varieties with different growth rates is to be performed, flower bud formation of the faster growing variety is suppressed by temperature control until the slower growing variety grows large enough, and then these varieties are simultaneously subjected to temperature changes to promote their flower bud formation, thereby allowing them to form flower buds at a similar time to each other so that they can be crossed. This eliminates the necessity for adjustments such as varying the timing to start cultivation depending on the growth rate in order to control the timing of crossing.

As used herein, the term "vegetative phase" refers to a period in which stems and leaves grow large, and the term "reproductive phase" refers to a period in which flower buds are formed and scapes elongate. Usually, plants undergo the vegetative phase and then shift to the reproductive phase. Also, as used herein, the term "flower buds" refers to buds that will bloom into flowers.

Non-limiting examples of plants of the Asteraceae family to which the method of the present invention can be applied include plants of the genera *Sonchus, Solidago, Helianthus, Taraxacum,* and *Lactuca*.

Examples of the plants of the genus *Sonchus* include *Sonchus oleraceus, Sonchus asper, Sonchus brachyotus,* and *Sonchus arvensis*.

Examples of the plants of the genus *Solidago* include *Solidago altissima, Solidago virgaurea* subsp. *asiatica, Solidago virgaurea* subsp. *leipcarpa, Solidago virgaurea* subsp. *leipcarpa f. paludosa, Solidago virgaurea* subsp. *gigantea,* and *Solidago gigantea* Ait. var. *leiophylla* Fernald.

Examples of the plants of the genus *Helianthus* include *Helianthus annuus, Helianthus argophyllus, Helianthus atrorubens, Helianthus debilis, Helianthus decapetalus,* and *Helianthus giganteus*.

Examples of the plants of the genus *Taraxacum* include dandelion (*Taraxacum*), *Taraxacum venustum* H. Koidz, *Taraxacum hondoense* Nakai, *Taraxacum platycarpum* Dahlst, *Taraxacum japonicum, Taraxacum officinale* Weber, *Taraxacum kok-saghyz,* and *Taraxacum brevicorniculatum*.

Examples of the plants of the genus *Lactuca* include *Lactuca sativa* and *Lactuca indica*.

The method of the present invention is suitably applicable to plants of the genus *Taraxacum*, among others, and is more suitably applicable to *Taraxacum kok-saghyz* or *Taraxacum brevicorniculatum*.

The method for cultivating plants of the Asteraceae family of the present invention promotes flower bud formation in the reproductive phase by setting the cultivation temperature in the reproductive phase lower by at least 5° C. than the cultivation temperature in the vegetative phase, in an environment in which the illuminance at the leaf level under light conditions is 10000 1x or lower. In other words, according to the present invention, plants in the vegetative phase are allowed to shift to the reproductive phase by lowering the cultivation temperature of the plants in the vegetative phase.

Usually, plants undergo the vegetative phase and then shift to the reproductive phase. Plants in the vegetative phase can be obtained by any method such as by growing plants from seeds. The plants can also be obtained by growing cuttings or grafts.

The cultivation temperature in the vegetative phase is not particularly limited as long as the later-described temperature difference can be achieved, but it is preferably 20° C. to 25° C., more preferably 22° C. to 24° C. Growth of plants can be further promoted at a temperature in the range indicated above.

The cultivation period in the vegetative phase is not particularly limited. For example, it is one to five months after seeding.

According to the present invention, the cultivation temperature of plants in the vegetative phase is lowered at any desired timing. Specifically, the cultivation temperature is set lower by at least 5° C., preferably at least 7° C., than the cultivation temperature in the vegetative phase, i.e., the cultivation temperature in the reproductive phase is set lower by at least 5° C., preferably at least 7° C., than the cultivation temperature in the vegetative phase to allow the plants in the vegetative phase to shift to the reproductive phase, thereby promoting flower bud formation in the reproductive phase.

As described above, (Cultivation temperature in vegetative phase)−(Cultivation temperature in reproductive phase) ≥5° C. The upper limit of the temperature difference: (Cultivation temperature in vegetative phase)−(Cultivation temperature in reproductive phase) is not particularly limited, but it is preferably 13° C., more preferably 10° C.

The upper limit of the cultivation temperature in the reproductive phase is not particularly limited as long as the above temperature difference can be achieved, but it is preferably 20° C., more preferably 18° C., still more preferably 16° C. The lower limit of the cultivation temperature in the reproductive phase is not particularly limited as long as the above temperature difference can be achieved, but it is preferably 12° C., more preferably 14° C. At a temperature in the range indicated above, the growth rate of plants can also be reduced so that the timing to cross the plants can be more easily understood.

The cultivation period in the reproductive phase is not particularly limited. For example, it is 0.1 to 2 months after the temperature change.

According to the present invention, it is further necessary to cultivate plants, at least in the reproductive phase, in an environment in which the illuminance at the leaf level under light conditions is 10000 1x or lower. An illuminance higher than 10000 1x deteriorates the flower bud-forming effect even when the low temperature treatment is performed. The lower limit of the illuminance at the leaf level is preferably 7000 1x. An illuminance lower than 7000 1x may result in insufficient photosynthesis, adversely affecting the growth of plants. For usual cultivation processes, however, an illuminance of 7000 to 8000 1x is sufficient.

Preferably, the plants in the vegetative phase are also cultivated in an environment with the same illuminance level as that in the reproductive phase.

Any light source may be used, and white fluorescent lamps are sufficient.

According to the present invention, the cultivation conditions other than the temperature and illuminance in the vegetative phase and the reproductive phase are not particularly limited. Cultivation may be carried out under conventionally known conditions. Plants may be cultivated either in hydroponic or soil media.

The photoperiod (light conditions) is preferably 12 hours or longer, more preferably 14 hours or longer. A photoperiod shorter than 12 hours may result in insufficient photosynthesis, adversely affecting the cultivation and growth of plants. The upper limit of the photoperiod is not particularly limited, but it is preferably 18 hours.

As used herein, the term "photoperiod" refers to a period of time within 24 hours in which the illuminance at the leaf level is in the above preferred range.

EXAMPLES

The present invention is specifically described with reference to examples, but the present invention is not limited to these examples.

Example 1

Seeds of *Taraxacum kok-saghyz* KAZ08-015 were vernalized at 4° C. for 2 or more days, and then planted in soil.

After planting in soil, they were cultivated at 23° C. under a cycle of 16 hours light and 8 hours dark for 3 months. The illuminance at the leaf level under light conditions was maintained at 7000 to 8000 lx. The illuminance at the leaf level under dark conditions was maintained at 1 lx or lower.

The *Taraxacum kok-saghyz* plants cultivated for 3 months after seeding were transferred to an 18° C. environment, and then the number of plants that formed flower buds within 1 month was counted. This process was carried out without changing the lighting conditions.

Example 2

Cultivation was carried out under the same conditions as in Example 1, except that the *Taraxacum kok-saghyz* plants cultivated for 3 months after seeding were transferred to a 16° C. environment. Then, the number of plants that formed flower buds within 1 month was counted.

Comparative Example 1

Cultivation was carried out under the same conditions as in Example 1, except that the *Taraxacum kok-saghyz* plants cultivated for 3 months after seeding were cultivated in a 23° C. environment for another month. Then, the number of plants that formed flower buds within 1 month was counted.

Comparative Example 2

Seeds of *Taraxacum kok-saghyz* KAZ08-015 were vernalized at 4° C. for 2 or more days, and then planted in soil.

After planting in soil, they were cultivated at 16° C. under a cycle of 16 hours light and 8 hours dark for 4 months. The illuminance at the leaf level under light conditions was maintained at 7000 to 8000 lx. The illuminance at the leaf level under dark conditions was maintained at 1 lx or lower.

Comparative Example 3

Cultivation was carried out under the same conditions as in Comparative Example 2, except that the *Taraxacum kok-saghyz* plants cultivated for 3 months after seeding were transferred to a 23° C. environment. Then, the number of plants that formed flower buds within 1 month was counted.

Comparative Example 4

Seeds of *Taraxacum kok-saghyz* KAZ08-015 were vernalized at 4° C. for 2 or more days, and then planted in soil.

After planting in soil, they were cultivated at 23° C. under a cycle of 16 hours light and 8 hours dark for 3 months. The illuminance at the leaf level under light conditions was maintained at 18000 to 20000 lx. The illuminance at the leaf level under dark conditions was maintained at 1x or lower.

The *Taraxacum kok-saghyz* plants cultivated for 3 months after seeding were transferred to a 16° C. environment, and then the number of plants that formed flower buds within 1 month was counted. This process was carried out without changing the lighting conditions.

Table 1 shows the temperature conditions and results of the examples and comparative examples.

TABLE 1

|  | Illuminance under light conditions (lx) | Temperature in vegetative phase (° C.) | Temperature in reproductive phase (° C.) | Number of plants cultivated (pcs) (A) | Number of plants that formed flower buds (pcs) (B) | Flower bud formation rate (%) (B/A*100) |
|---|---|---|---|---|---|---|
| Example 1 | 7000-8000 | 23 | 18 | 6 | 3 | 50.0 |
| Example 2 | 7000-8000 | 23 | 16 | 6 | 4 | 66.7 |
| Comparative Example 1 | 7000-8000 | 23 | 23 | 6 | 1 | 16.7 |
| Comparative Example 2 | 7000-8000 | 16 | 16 | 8 | 2 | 25.0 |
| Comparative Example 3 | 7000-8000 | 16 | 23 | 6 | 1 | 16.7 |
| Comparative Example 4 | 18000-20000 | 23 | 16 | 6 | 1 | 16.7 |

The results show that in the cultivation of plants of the Asteraceae family, flower bud formation in the reproductive phase was promoted by setting the cultivation temperature in the reproductive phase lower by at least 5° C. than the cultivation temperature in the vegetative phase, in an environment in which the illuminance at the leaf level under light conditions was 10000 lx or lower.

The invention claimed is:

1. A method for cultivating plants of the Asteraceae family, said method comprising:
cultivating plants of the Asteraceae family wherein the plants of the Asteraceae family are *Taraxacum kok-saghyz* or *Taraxacum brevicorniculatum*,
wherein the plants undergo vegetative phase and then shift to reproductive phase, and
wherein a cultivation temperature in the reproductive phase in an environment with an illuminance at the leaf level under light conditions of 10000 lx or lower is set lower by at least 5° C. then a cultivation temperature in the vegetative phase to promote flower bud formation in the reproductive phase.

2. The method for cultivating plants of the Asteraceae family according to claim 1,
   wherein the cultivation temperature in the reproductive phase is set lower by at least 7° C. than the cultivation temperature in the vegetative phase.

3. The method for cultivating plants of the Asteraceae family according to claim 1,
   wherein the cultivation temperature in the reproductive phase is 18° C. or lower.

4. The method for cultivating plants of the Asteraceae family according to claim 1,
   wherein the cultivation temperature in the reproductive phase is 16° C. or lower.

\* \* \* \* \*